United States Patent
Golecki et al.

(10) Patent No.: US 8,347,908 B2
(45) Date of Patent: Jan. 8, 2013

(54) LIGHTWEIGHT TITANIUM ALUMINIDE VALVES AND METHODS FOR THE MANUFACTURE THEREOF

(75) Inventors: Ilan Golecki, Parsippany, NJ (US); Robert Franconi, New Hartford, CT (US); Mike McCollum, Tempe, AZ (US); Amer Aizaz, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 596 days.

(21) Appl. No.: 12/549,098

(22) Filed: Aug. 27, 2009

(65) Prior Publication Data

US 2011/0049410 A1    Mar. 3, 2011

(51) Int. Cl.
*F16K 27/00* (2006.01)

(52) U.S. Cl. .................. 137/375; 251/305; 251/368

(58) Field of Classification Search .......... 251/305–308, 251/368; 137/375
See application file for complete search history.

(56) References Cited

U.S. PATENT DOCUMENTS

| | | | |
|---|---|---|---|
| 3,958,595 A | 5/1976 | Al et al. | |
| 4,010,775 A | 3/1977 | Roberts | |
| 4,016,008 A | 4/1977 | Forbes Jones et al. | |
| 4,344,454 A | 8/1982 | Chan | |
| 4,601,087 A | 7/1986 | Kawai et al. | |
| 4,646,407 A | 3/1987 | Mayhew, Jr. | |
| 4,867,116 A | 9/1989 | de Freitas Couto Rosa et al. | |
| 4,966,748 A | 10/1990 | Miyasaka et al. | |
| 5,019,334 A | 5/1991 | Jackson | |
| 5,084,113 A | 1/1992 | Mori et al. | |
| 5,226,977 A | 7/1993 | Kitaguchi et al. | |
| 5,281,484 A | 1/1994 | Tank et al. | |
| 5,320,882 A | 6/1994 | Chen | |
| 5,348,702 A | 9/1994 | Matsuo et al. | |
| 5,626,179 A | 5/1997 | Choudhury et al. | |
| 6,089,843 A * | 7/2000 | Kondoh ...................... 418/179 |
| 6,185,821 B1 | 2/2001 | Wu | |
| 6,218,026 B1 * | 4/2001 | Ewing et al. ................. 428/553 |
| 6,264,168 B1 | 7/2001 | Wu | |
| 6,387,541 B1 * | 5/2002 | Gray et al. .................... 428/660 |
| 6,427,975 B1 * | 8/2002 | Powell .......................... 251/305 |
| 6,579,486 B1 | 6/2003 | Nakajima et al. | |
| 6,722,137 B2 * | 4/2004 | Proctor et al. ................. 60/782 |
| 6,878,412 B2 | 4/2005 | Hebeisen et al. | |
| 6,912,984 B2 * | 7/2005 | Narasimhan et al. ...... 123/188.3 |
| 7,066,710 B2 * | 6/2006 | Wiggins et al. ................ 415/19 |

(Continued)

OTHER PUBLICATIONS

2 Way, 2 Position. [online]. Ausco, Inc. Retrieved from Internet: <http://ausco.thomasnet.com/printitem/solenoid-valves/2-way-2-position/1-1012?&plpver= . . . . Pneumatic Valves. [online]. Aerodyne Controls. Retrieved from Internet: <http://www.aerodyne-controls.com/pneumatic_valves.htm.

*Primary Examiner* — John Bastianelli
(74) *Attorney, Agent, or Firm* — Ingrassia Fisher & Lorenz, P.C.

(57) ABSTRACT

Embodiments of a lightweight, high temperature airborne valve are provided. In one embodiment, the airborne vale includes a valve element and a flowbody. The flowbody is formed at least partially from a titanium aluminide alloy and has a flow passage therethrough in which the valve element is movably mounted. Embodiments of a method for producing such a lightweight, high temperature airborne valve are also provided. In one embodiment, the method includes the steps of forming a lightweight flowbody at least partially from a titanium aluminide alloy, hot isostatically pressing the lightweight flowbody, and machining the lightweight flowbody to desired dimensions.

8 Claims, 4 Drawing Sheets

U.S. PATENT DOCUMENTS

| | | | |
|---|---|---|---|
| 7,160,635 B2 * | 1/2007 | Leyens et al. | 428/698 |
| 7,188,559 B1 | 3/2007 | Vecchio | |
| 7,240,878 B2 * | 7/2007 | Towne | 244/159.3 |
| 2006/0166020 A1 * | 7/2006 | Raybould et al. | 428/471 |
| 2006/0254553 A1 * | 11/2006 | Stark et al. | 123/188.1 |
| 2007/0163655 A1 * | 7/2007 | Hunter | 137/375 |
| 2007/0205386 A1 * | 9/2007 | McDowall et al. | 251/305 |
| 2008/0078081 A1 | 4/2008 | Huff et al. | |
| 2008/0102298 A1 | 5/2008 | Kurze et al. | |

* cited by examiner

US 8,347,908 B2

LIGHTWEIGHT TITANIUM ALUMINIDE VALVES AND METHODS FOR THE MANUFACTURE THEREOF

TECHNICAL FIELD

The present invention relates generally to valves and, more particularly, to embodiments of lightweight valves well suited for use in high temperature airborne applications, such as deployment aboard an aircraft.

BACKGROUND

Airborne valves are commonly deployed aboard aircraft to regulate fluid flow. An airborne valve, and specifically the material from which the flowbody of the airborne valve is cast, ideally has relatively low density, is highly durable, and is highly ductile. When intended to operate in lower temperature environments, airborne valve flowbodies are commonly cast from aluminum and aluminum-based alloys, which generally satisfy the foregoing criteria. However, when the airborne valve is to be utilized within higher temperature environments (e.g., approaching and possibly exceeding approximately 1,200° Fahrenheit), such as when the airborne valve is used to regulate compressor or combustive gas flow from a gas turbine engine, aluminum and aluminum-based alloys are typically unsuitable as flowbody materials due to operational temperature limitations. For this reason, it is conventional practice in aerospace industry to cast high temperature valve flowbodies from high-strength, refractory metal alloys, such as 17-4PH stainless steel or Inconel 718®. Although durable and relatively ductile, such refractory metal alloys have relatively high densities (e.g., the densities of 17-4PH stainless steel and Inconel 718® are approximately 7.74 grams per cubic centimeter ($g/cm^3$) and 8.22 $g/cm^3$, respectively). Airborne valve flowbodies cast from such high temperature materials are consequently undesirably heavy for utilization in airborne applications.

Titanium aluminide alloys have relatively low densities and have been utilized to fabricate certain dynamic components deployed within gas turbine engine, such as air turbine blades. However, titanium aluminide alloys have long been considered excessively brittle for use in the fabrication of high temperature airborne flowbodies, which serve as pressure vessels that conduct highly pressured fluids during operation (e.g., pressured bleed air having pressures exceeding several hundred pounds per square inch (psi) and commonly approaching 600 psi). Titanium aluminide alloys have also been utilized to produce certain non-pressure containing valve components (e.g., poppet-type valve elements) for other ground-based pneumatic systems, such as for automotive internal combustion engines. Titanium aluminide alloys have not, however, been utilized to produce static, pressure-containing valve flowbodies in any context of which the present inventors are aware. Furthermore, in the terrestrial applications set-forth above, the operational requirements, the valve types, and the valve designs are markedly disparate from the high temperature, high pressure airborne valve flowbodies utilized in the aerospace industry.

There thus exists an ongoing need to provide embodiments of a high temperature airborne valve having a reduced weight as compared to conventional airborne valves produced utilizing high density material, such as 17-4PH stainless steel and Inconel 718®. In accordance with embodiments of the present invention, and as described in the subsequent sections of this document, this ongoing need is satisfied by providing airborne valves including lightweight flowbodies formed, at least in part, from titanium aluminide. It would also be desirable to provide one or more methods for manufacturing such lightweight, high temperature airborne valves. Other desirable features and characteristics of the present invention will become apparent from the subsequent Detailed Description and the appended claims, taken in conjunction with the accompanying drawings and this Background.

BRIEF SUMMARY

Embodiments of a lightweight, high temperature airborne valve are provided. In one embodiment, the airborne valve includes a flowbody and a valve element. The flowbody is formed at least partially from a titanium aluminide alloy and has a flow passage therethrough in which the valve element is movably mounted.

Embodiments of a pneumatic avionic system for deployment aboard an aircraft are further provided. In one embodiment, the pneumatic avionic system includes an aircraft duct and a lightweight, high temperature airborne valve fluidly coupled to the aircraft duct. The lightweight, high temperature airborne valve includes a flowbody having a flow passage therethrough, and a valve element movably mounted within the flow passage for modulating fluid flow therethrough. The flowbody is formed at least partially from a titanium aluminide alloy.

Embodiments of a method for producing such a lightweight, high temperature airborne valve are still further provided. In one embodiment, the method includes the steps of forming a lightweight flowbody at least partially from a titanium aluminide alloy, hot isostatically pressing the lightweight flowbody, and machining the lightweight flowbody to desired dimensions.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
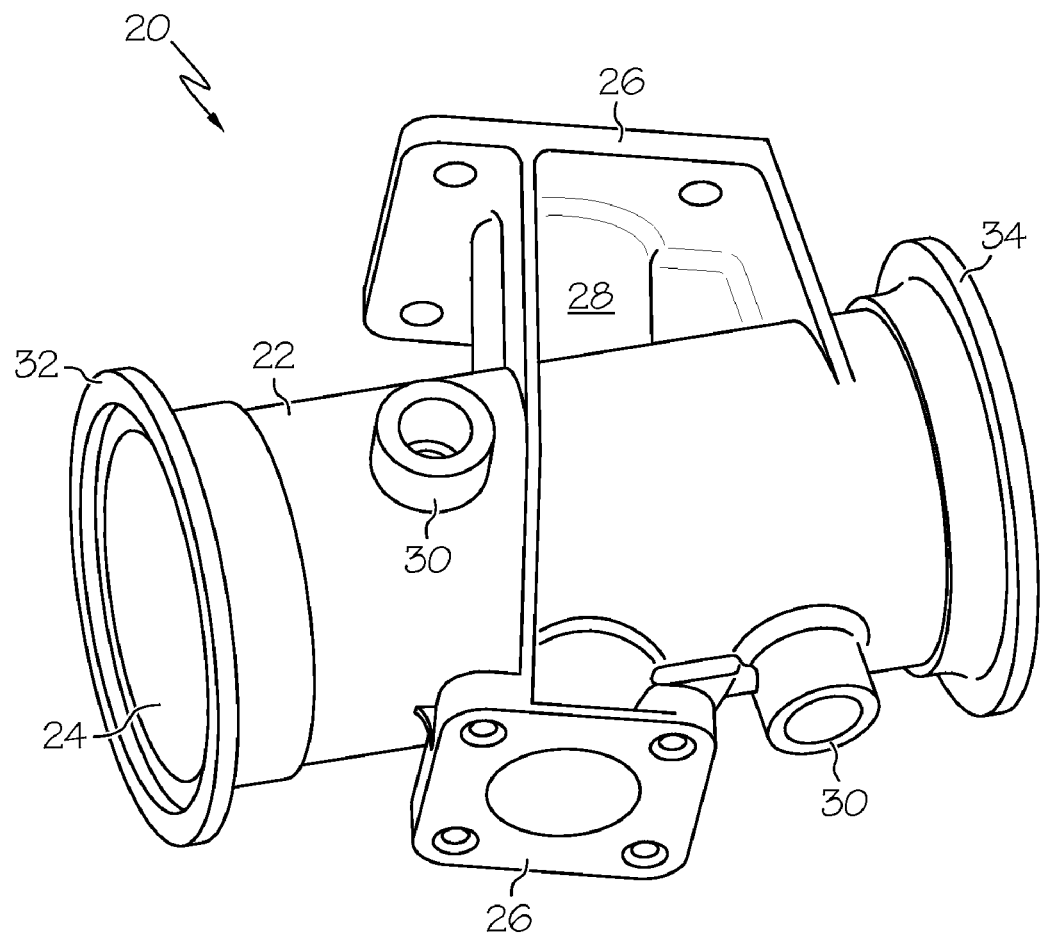
FIG. 1 is an isometric view of a lightweight, high temperature airborne valve including a flowbody formed at least partially from titanium aluminide in accordance with a first exemplary embodiment.

FIG. 1 is an isometric view of a lightweight, high temperature airborne valve 20 suitable for deployment onboard an aircraft in accordance with an exemplary embodiment. Airborne valve 20 includes a flowbody 22 having a flow passage or axial bore 24 therethrough. By way of non-limiting example, flowbody 22 is illustrated in FIG. 1 as having a generally cylindrical shape and including the following features: (i) first and second plate structures 26 to which a valve actuator (not shown) or other component may be mounted, (ii) a tubular structure 28 extending between plate structures 26 and through which a drive shaft (not shown) may extend, (iii) a plurality of bosses 30, and (iv) first and second radial flanges 32 and 34, which are provided around first and second opposing ends of flowbody 22, respectively. When high temperature airborne valve 20 is fully assembled, a valve element (hidden from view in FIG. 1) is mounted within axial bore 24. In the illustrated example, specifically, a butterfly plate may be disposed within axial bore 24 and mounted on a rotatable drive shaft (not shown), which is, in turn, mechanically coupled to valve actuator (also not shown). This example notwithstanding, the valve element may assume any form suitable for modulating fluid flow through the flow passage of airborne valve 20. For example, in embodiments wherein high temperature airborne valve 20 assumes the form of a right-angle poppet valve or an inline poppet valve, the valve element disposed within axial bore 24 may be a poppet.

In accordance with the teachings of the present invention, flowbody 22 is formed at least partially from a titanium aluminide (TiAl) alloy; and, in a preferred group of embodiments, flowbody 22 is cast substantially entirely from a titanium aluminide alloy. Still more preferably, flowbody 22 is cast from a titanium aluminide alloy that is near-stoichiometric (i.e., has a titanium to aluminum ratio of approximately 1:1 on the atomic scale) and/or that has a density in the range of approximately 3.5 g/cm$^3$ to approximately 5.0 g/cm$^3$. Notably, titanium aluminide alloys have relatively low densities as compared to the high-strength, refractory metal alloys, such as 17-4PH stainless steel and Inconel 718®, conventionally utilized to produce valve flowbodies in the aerospace industry. As a result, flowbody 22 weighs significantly less than a similar flowbody formed from a conventional refractory metal alloy. At the same time, TiAl flowbody 22 is operable in high temperature and high pressure environments; e.g., operational environments characterized by temperatures approaching or exceeding 1200° Fahrenheit and pressures approaching or exceeding several hundred psi. TiAl flowbody 22, and more generally airborne valve 20, is consequently well suited for deployment aboard an aircraft as a means for regulating the flow of a heated and highly pressurized fluid, such as combustive gas flow bled from the combustor of a gas turbine engine.

It will be appreciated that the terms "titanium aluminide alloy" and "TiAl alloy" are utilized to denote an alloy containing titanium and aluminum as the primary constituents. A given titanium aluminide alloy can, and typically will, include lesser amounts of one or more additional metallic or non-metallic constituents. A non-exhaustive list of additional components that may be contained within a particular titanium aluminide alloy includes manganese, boron, niobium, molybdenum, titanium diboride, and the like. Such additive components may be added in powder form to a master alloy during processing to optimize the metallurgical properties of the resulting titanium aluminide alloy.

As previously noted, titanium aluminide alloys have been utilized in the production of dynamic components deployed within gas turbine engine, such as air turbine blades. In addition, titanium aluminide alloys have been utilized to fabricate valve elements in automotive internal combustion engines. However, titanium aluminide alloys have not conventionally been utilized to produce a flowbody or pressure vessel included within an airborne valve. Indeed, it has long been believed within the aeronautical field that titanium aluminide alloys are unsuitable for use in the production of pressure vessels due to the relatively low ductility, and therefore the relative brittleness, of titanium aluminides. However, contrary to this long held belief, the present inventors have discovered that, in principle, certain titanium aluminide alloys can be utilized to produce airborne valve flowbodies capable of operating at elevated temperatures and pressures characteristic of avionic applications. Furthermore, the present inventors have discovered that by producing airborne valve flowbodies from titanium aluminide, in substantial part or in entirety, a substantial weight savings can be realized as compared to airborne valve flowbodies formed from conventional high temperature materials, such as 17-4PH stainless steel and Inconel 718®.

Figure 2:
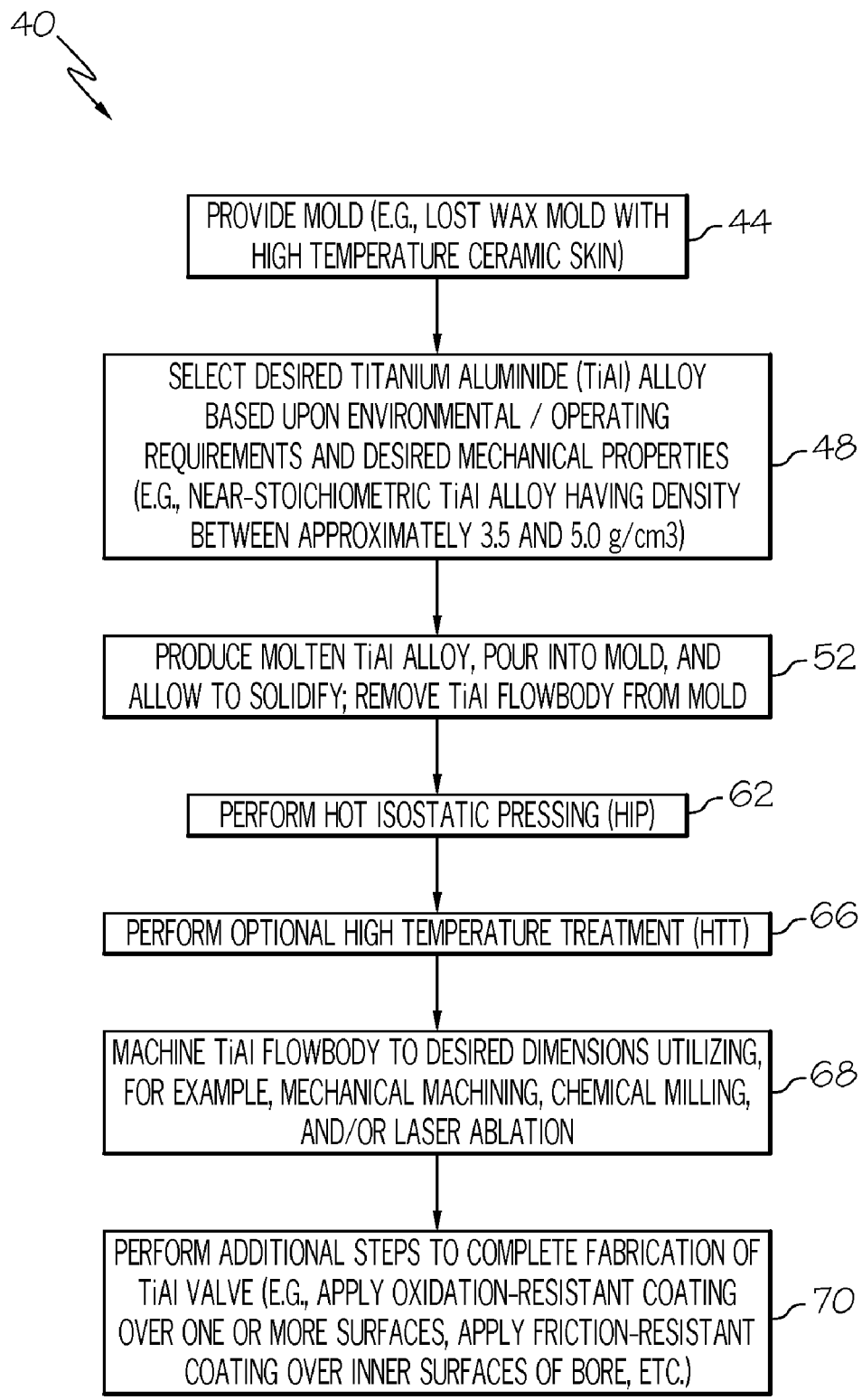
FIG. 2 is an exemplary manufacturing process suitable for producing a lightweight, high temperature airborne valve having a flowbody cast substantially entirely from titanium aluminide in accordance with a further exemplary embodiment.
Figure 3:
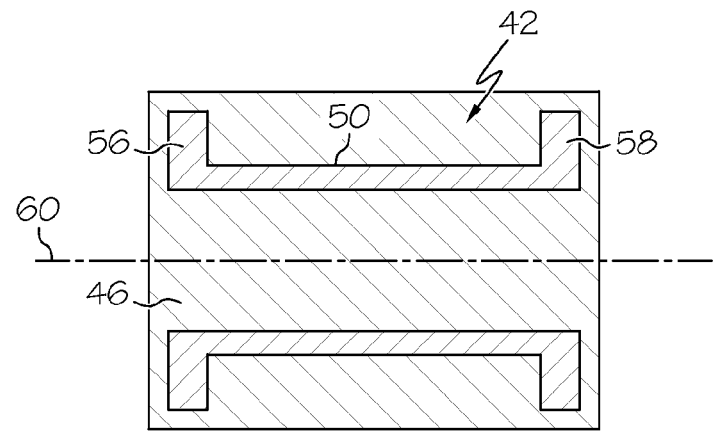
FIGS. 3-8 are generalized cross-sectional views of an exemplary lightweight, high temperature airborne valve at various stages of manufacture and produced in accordance with the exemplary manufacturing process illustrated in FIG. 2.

FIG. 2 is a flowchart illustrating an exemplary method 40 suitable for producing a lightweight, high temperature airborne valve including a TiAl flowbody. FIGS. 3-8 illustrate in cross-section a generalized airborne valve 42 at various stages of manufacture and produced in accordance with exemplary method 40 (FIG. 2). In this particular example, airborne valve 42 assumes the form of a cylindrically-shaped butterfly valve; however, it is emphasized that method 40 can be utilized to produce any suitable type of airborne valve, including various types of poppet valves. To commence exemplary method 40 (STEP 44), a mold is provided that defines the general shape and approximate dimensions of airborne valve 42. For example, and with reference to FIG. 3, a lost wax mold 46 having a skin formed from ceramic or other high temperature material can be produced during STEP 44 in the well-known manner (e.g., by producing a model from wax or other sacrificial material having a relatively low melting point, forming a ceramic mold over the model, and then heating the mold/model to a temperature sufficient to melt the model and thus produce a cavity within the mold). Airborne valve 42 is preferably cast slightly oversized and subsequently machined to desired dimensions as described more fully below.

Next, at STEP 48, the particular titanium aluminide alloy that will ultimately be utilized to form the flowbody of airborne valve 42 is selected. As indicated in FIG. 2, the particular titanium aluminide alloy selected during STEP 48 is typically chosen based, at least in part, upon the environmental and operational requirements of airborne valve 42. As a general example, a group of candidate titanium aluminide alloys can first be identified based upon minimal strength requirements, and then the most ductile alloy within the group of candidate titanium aluminide alloys may be selected for use. In a preferred group of embodiments, a titanium aluminide alloy that is near-stoichiometric (i.e., that has an atomic ratio of Ti to Al of approximately 1:1) and/or that has a density between approximately 3.5 g/cm$^3$ to approximately 5.0 g/cm$^3$ is chosen during STEP 48.

Figure 4:
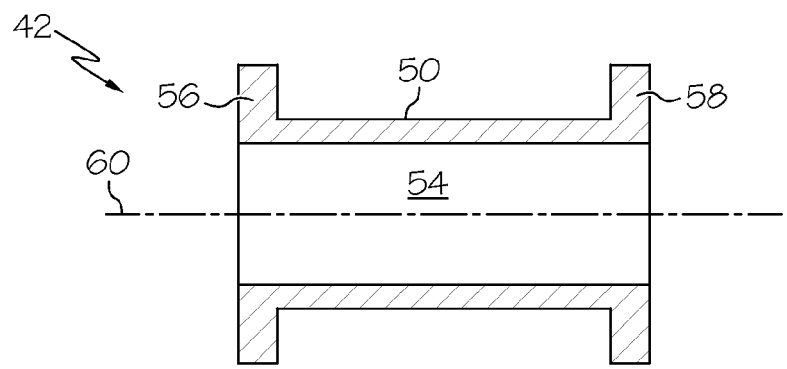

After selection of a desired titanium aluminide alloy (STEP 48), the titanium aluminide is heated and melted in an appropriate enclosure substantially devoid of oxidants, poured into mold 46 in molten form, and then allowed to solidify to produce a lightweight TiAl flowbody 50 (STEP 52). TiAl flowbody 50 is then removed, partially or entirely, from mold 46. In the exemplary embodiment illustrated in FIG. 4, TiAl flowbody 50 is formed to include a flow passage (i.e., an axial bore) 54 therethrough, a first radial mounting flange 56 integrally formed around a first end portion of TiAl flowbody 50, and a second radial mounting flange 58 integrally formed around a second opposing end portion of TiAl flowbody 50. As indicated in FIG. 4 by centerline 60, TiAl flowbody 50, first radial flange 56, and second radial flange 58 each have a generally annular three-dimensional form; however, it is again emphasized that the particular geometries and structural features of TiAl flowbody 50 and, more generally, of airborne valve 42 will inevitably vary amongst different embodiments.

Figure 5:
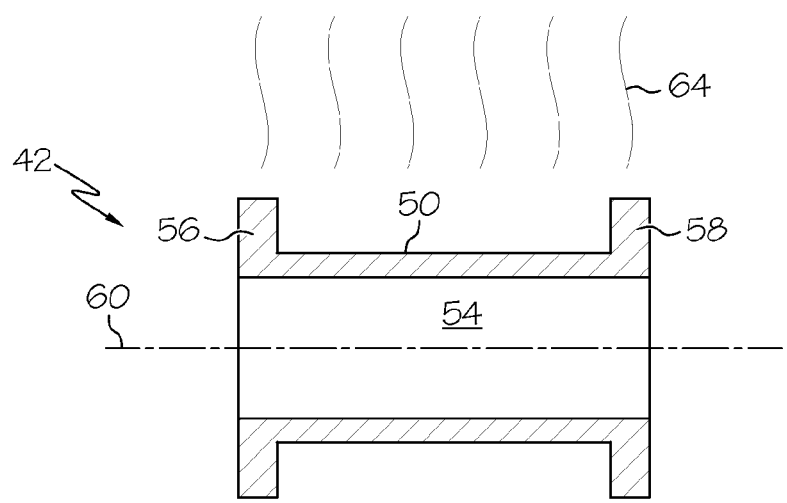

Continuing with exemplary method 40 (FIG. 2), TiAl flowbody 50 next undergoes a hot isostatic pressing or HIP process (STEP 62) in an appropriate environment. As indicated in FIG. 5 by heat lines 64, TiAl flowbody 50 is subjected to elevated pressures and temperatures for a predetermined time period during the HIP process to consolidate the titanium aluminide alloy microstructure. In certain embodiments, a characterization process may then be performed during which TiAl flowbody 50 is examined for structural defects utilizing X-ray radiography or another inspection technique before advancing to STEP 66 of exemplary method 40 (FIG. 2). Subsequent to the HIP process, one or more high temperature treatments (HTTs) are conveniently, although not necessarily, performed in an appropriate environment (STEP 66). As will be readily appreciated, during each HTT, TiAl flowbody 50 is subjected to an elevated temperature for a predetermined time period to refine and further reduce residual stresses within the TiAl alloy microstructure. In certain embodiments, a characterization process may then be performed during which TiAl flowbody 50 is examined for structural defects utilizing X-ray radiography or another inspection technique before advancing to STEP 68 of exemplary method 40 (FIG. 2).

Figure 6:
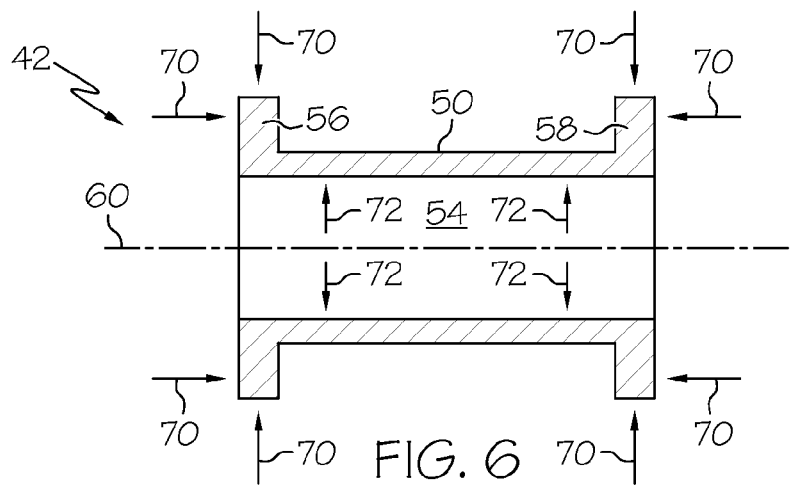

During STEP 68 of exemplary method 40 (FIG. 2), one or more surfaces or structural features of TiAl flowbody 50 are machined to desired dimensions. For example, as indicated in FIG. 6 by arrows 70, radial mounting flanges 56 and 58 may be machined to fine tune the dimensions thereof. Additionally or alternatively, thickness may be removed from the inner surfaces of TiAl flowbody 50 to bring the diameter of axial bore 54 to within a relatively close tolerance of a target dimension (indicated in FIG. 6 by arrows 72). Various other features may also be formed on, through, or within TiAl flowbody 50 during STEP 68 (e.g., holes may be drilled through mounting features provided on TiAl flowbody 50 to receive bolts or other mechanical fasteners). To this end, any suitable machining technique or combination of techniques can be employed during STEP 68 including, but not limited to, mechanical machining (e.g., grinding, mechanical turning, etc.), chemical milling, laser ablation, and the like.

Figure 7:
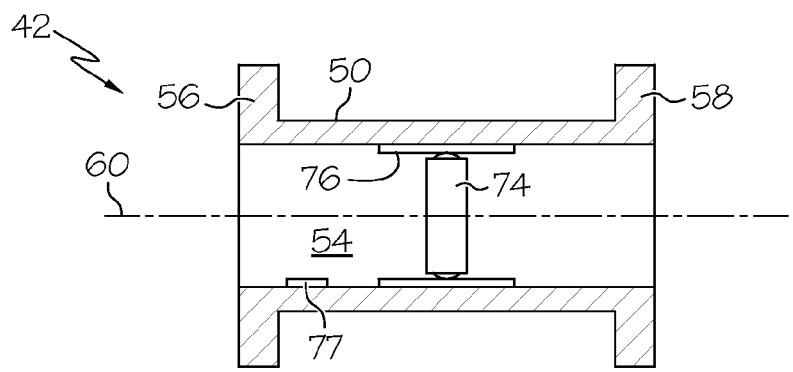
Figure 8:
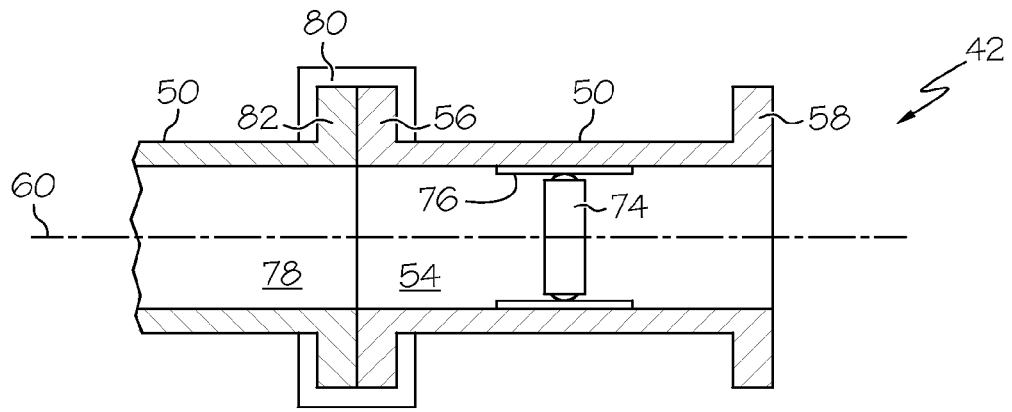

To conclude exemplary method 40 (FIG. 2), various additional fabrication steps are performed to complete fabrication of airborne valve 42 (STEP 70). For example, as illustrated generically in FIG. 7, a valve element 74 (e.g., a butterfly disc) is mounted within axial bore 54 provided through airborne valve 42. Disc element 74 may include a wiper seal that sealingly engages an inner surface of the axial bore. A wear-resistant coating 76 may optionally be applied over the inner surface of TiAl flowbody 50 defining axial bore 54 or, at minimum, the area of axial bore 54 sealingly engaged by valve element 74 through its range of motion. Wear-resistant coating 76 is enlarged in FIG. 7 for clarity. In embodiments wherein valve element 74 assumes the form of a poppet or other translating member, a wear-resistance coating may also be necessary. Other coatings may also be applied over one or more surfaces of airborne valve 42 during STEP 70 including, for example, an oxidation-resistant coating. For example, as indicated in FIG. 7 at 77, an oxidation-resistant coating can be applied to all surfaces or to selected surfaces of flowbody 50 (e.g., to the surfaces exposed to hot gas flow during operation of valve 42), as appropriate. As should be readily appreciated, oxidation-resistant coating 77 is only partially shown and enlarged in FIG. 7 for clarity. Finally, a characterization process may be performed utilizing X-ray radiography or another inspection technique to ensure that airborne valve 42 is substantially free of structural defects.

After fabrication, airborne valve 42 can be installed within a pneumatic avionic system deployed aboard an aircraft. For example, with reference to FIG. 8, airborne valve 42 is installed within pneumatic avionic system including an aircraft duct 78. More specifically, radial mounting flange 56 of TiAl flowbody 50 is clamped (e.g., utilizing, for example, a V-band clamp 80) to a corresponding radial flange 82 provided around duct 78 such that the radial face of radial mounting flange 56 abuts and is held against the radial face of radial flange 82. An alternate flange design and sealing method may include a groove formed in at least one of the two mating flanges and an appropriate gasket or O-ring, such as a metallic gasket, inserted into the groove to provide required sealing over the operating temperature and pressure ranges of the valve assembly. During operation of the pneumatic avionic system, TiAl flowbody 50 of airborne valve 42 conducts a heated, pressurized fluid, such as compressor or combustive gas flow, either to or from aircraft duct 78. As previously stated, TiAl flowbody 50 is especially well-suited for this purpose due to its reduced weight and ability to maintain its structural integrity at relatively high operational temperatures.

Exemplary Embodiments of Titanium Aluminide Airborne Valve Flowbodies Reduced to Practice By way of illustration and not of limitation, the following table provides the composition of two titanium aluminide alloys utilized to produce airborne valve flowbodies in actual practice. During manufacture, the titanium aluminide alloys were each liquefied and poured into one or more ceramic molds within an appropriate enclosure substantially devoid of oxidants. Then, after solidification of the corresponding flowbodies, the latter were removed from the ceramic molds. The resulting valve flowbodies were then subjected to additional processing steps (e.g., hot isostatic pressing) and subsequently weighed. Two airborne valve flowbodies were cast from the first titanium aluminide alloy (identified as "Example 1" in the table below) and weighed approximately 1,791.83 grams and 1,797.36 grams. By comparison, a nominally identical valve flowbody cast from an Inconel 718® alloy weighed approximately 3,383.14 grams, approximately 89% heavier than the valve flowbodies cast from the first titanium aluminide alloy ("Example 1"). In other words, the TiAl valve flowbodies weighed approximately 47% less than the nominally identical Inconel 718® valve flowbody. Fewer structural defects were detected within the valve flowbodies cast from the first titanium aluminide alloy ("Example 1") than within the valve flowbody cast from the second titanium aluminide alloy ("Example 2").

| Component | Example 1 At. % | Example 2 At. % |
| --- | --- | --- |
| Titanium | 50.2 | 51.4 |
| Aluminum | 45.0 | 43.5 |
| Manganese | 2.0 | — |
| Niobium | 2.0 | 4.0 |
| Boron | — | 0.1 |
| Molybdenum | — | 1.0 |
| Titanium Diboride | 0.8 | — |

Exemplary valve flowbodies cast from the first TiAl alloy (identified as "Example 1" above) were further machined by mechanical means to create flanges with desired dimensions and properties. A flowbody with the machined flange was connected to a mating flange of a test system, using a V-band clamp, and clamped successfully in place, using standard procedures. No damage to the flange of the TiAl flowbody was visible after this clamping test, and this flange further successfully passed a post-clamping test fluorescent penetrant inspection (FPI) procedure.

In view of the above, it should be appreciated that there has been provided multiple exemplary embodiments of a lightweight, high temperature airborne valve including a flowbody formed, at least partially, from a titanium aluminide alloy. The foregoing has also provided at least one exemplary embodiment of a method for manufacturing such a lightweight, high temperature airborne valve. While, in the above-described embodiments, the airborne valve assumed the form of a cylindrically-shaped butterfly valve, alternative embodiments of the present invention may assume various other forms, including those of a right-angle poppet valve and an inline poppet valve. In certain embodiments, other machined or hot isostatic pressed parts can be bonded or otherwise joined to the titanium aluminide flowbody utilizing, for example, brazing or welding.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A lightweight, high temperature airborne valve, comprising:
   a valve element; and
   a flowbody having a flow passage therethrough in which the valve element is movably mounted, the flowbody formed substantially entirely from a near-stoichiometric titanium aluminide alloy having a density between approximately 3.5 grams per cubic centimeter and approximately 5.0 grams per cubic centimeter, the near-stoichiometric titanium aluminide alloy comprising, by atomic percentage:
   about 50.2% titanium;
   about 45.0% aluminum;
   about 2.0% manganese;
   about 2.0% niobium; and
   about 0.8% titanium diboride.

2. A lightweight, high temperature airborne valve according to claim 1 further comprising an oxidation-resistant coating applied over at least one surface of the flowbody.

3. A lightweight, high temperature airborne valve according to claim 1 further comprising a wear-resistant coating applied over an inner surface of the flowbody contacted by the valve element in a closed position.

4. A lightweight, high temperature airborne valve, comprising:
   a valve element; and
   a flowbody having a flow passage therethrough in which the valve element is movably mounted, the flowbody formed substantially entirely from a near-stoichiometric titanium aluminide alloy having a density between approximately 3.5 grams per cubic centimeter and approximately 5.0 grams per cubic centimeter, the near-stoichiometric titanium aluminide alloy comprising, by atomic percentage:
   about 51.4% titanium;
   about 43.5% aluminum;
   about 4.0% niobium;
   about 0.1% boron; and
   about 1.0% molybdenum.

5. A pneumatic avionic system for deployment aboard an aircraft, the pneumatic avionic system comprising:
   an aircraft duct; and
   a lightweight, high temperature airborne valve fluidly coupled to the aircraft duct, the lightweight, high temperature airborne valve comprising:
   a flowbody having a flow passage therethrough; and
   a valve element movably mounted within the flow passage for modulating fluid flow therethrough;
   wherein the flowbody is formed substantially entirely from a titanium aluminide alloy having a density between approximately 3.5 grams per cubic centimeter and approximately 5.0 grams per cubic centimeter, the titanium aluminide alloy selected from the group consisting of a first titanium aluminide alloy and a second titanium aluminide alloy;
   wherein the first titanium aluminide alloy comprises:
   about 50.2% titanium;
   about 45.0% aluminum;
   about 2.0% manganese;
   about 2.0% niobium; and
   about 0.8% titanium diboride; and
   wherein the second titanium aluminide alloy comprises:
   about 51.4% titanium;
   about 43.5% aluminum;
   about 4.0% niobium;
   about 0.1% boron; and
   about 1.0% molybdenum.

6. A pneumatic avionic system according to claim 5 wherein the flowbody is formed substantially entirely from a near-stoichiometric titanium aluminide alloy.

7. A pneumatic avionic system according to claim 5 further comprising an oxidation-resistant coating applied over at least one surface of the flowbody.

8. A pneumatic avionic system according to claim 5 further comprising a wear-resistant coating applied over an inner surface of the flowbody contacted by the valve element in a closed position.

* * * * *